United States Patent
Gururao et al.

(10) Patent No.: US 10,574,544 B2
(45) Date of Patent: Feb. 25, 2020

(54) METHOD OF CERTIFYING RESILIENCY AND RECOVERABILITY LEVEL OF SERVICES BASED ON GAMING MODE CHAOSING

(71) Applicant: International Business Machines Corporation, Armonk, NY (US)

(72) Inventors: Indumathy Gururao, Bangalore (IN); Sudheesh Sivadasan Kairali, Kerala (IN); Rohit Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 15/398,563

(22) Filed: Jan. 4, 2017

(65) Prior Publication Data

US 2018/0191579 A1 Jul. 5, 2018

(51) Int. Cl.
- H04L 12/00 (2006.01)
- H04L 12/24 (2006.01)
- G06F 11/36 (2006.01)

(52) U.S. Cl.
CPC ...... H04L 41/5038 (2013.01); H04L 41/5009 (2013.01); *G06F 11/3668* (2013.01)

(58) Field of Classification Search
CPC ............. H04L 41/5038; H04L 41/5009; G06F 11/3668
USPC .................................. 709/223, 224; 717/103
See application file for complete search history.

(56) References Cited

U.S. PATENT DOCUMENTS

| | | | | |
|---|---|---|---|---|
| 6,012,152 A * | 1/2000 | Douik | ................ | G06F 11/0709 714/26 |
| 6,148,410 A * | 11/2000 | Baskey | ............... | H04L 41/0654 714/4.11 |
| 6,553,568 B1 * | 4/2003 | Fijolek | ................... | H04L 29/06 348/E7.071 |
| 6,556,659 B1 * | 4/2003 | Bowman-Amuah | ... | H04L 12/14 370/252 |
| 6,681,232 B1 * | 1/2004 | Sistanizadeh | ....... | H04L 41/0213 |
| 6,779,135 B1 * | 8/2004 | Ur | ........................ | G06F 11/3676 714/37 |
| 6,857,020 B1 * | 2/2005 | Chaar | .................... | G06Q 10/10 709/223 |
| 7,020,797 B2 * | 3/2006 | Patil | .................... | G06F 11/3672 709/223 |
| 7,730,172 B1 * | 6/2010 | Lewis | .................... | G06Q 10/04 709/224 |
| 7,937,685 B2 * | 5/2011 | Weil | ......................... | G06F 8/71 717/103 |
| 7,991,850 B2 * | 8/2011 | Lavin | .................. | G06F 11/1417 707/640 |

(Continued)

*Primary Examiner* — Frantz Coby (74) *Attorney, Agent, or Firm* — Patterson + Sheridan, LLP (57) ABSTRACT

Embodiments of the present disclosure provide a method, system, and computer program product for certifying resiliency and recoverability level of services. The method, system and computer program product include receiving a level of testing for a target service used by an application in an ordinary course of operation. The monitoring system disrupts expected behavior of the application by adjusting one or more parameters of the application. The monitoring system determines whether the service is able to recover based on the application behavior. Upon determining that the service is able to recover based on the application behavior, reporting the level of testing as the level of testing received.

20 Claims, 6 Drawing Sheets

(56) References Cited

U.S. PATENT DOCUMENTS

| | | | |
|---|---|---|---|
| 8,510,592 B1* | 8/2013 | Chan | G06F 11/0751 |
| | | | 714/5.1 |
| 8,688,500 B1 | 4/2014 | Hart et al. | |
| 9,934,385 B2* | 4/2018 | Chestna | G06F 21/577 |
| 2002/0076056 A1* | 6/2002 | Pavlakos | A61B 5/12 |
| | | | 381/60 |
| 2003/0191590 A1* | 10/2003 | Narayan | H04L 41/22 |
| | | | 702/68 |
| 2004/0158766 A1* | 8/2004 | Liccione | G06F 11/2023 |
| | | | 714/4.11 |
| 2007/0156919 A1* | 7/2007 | Potti | G06F 8/656 |
| | | | 709/238 |
| 2010/0149965 A1* | 6/2010 | Jung | H04L 69/40 |
| | | | 370/216 |
| 2011/0126168 A1* | 5/2011 | Ilyayev | G06F 9/5072 |
| | | | 717/103 |
| 2013/0185667 A1 | 7/2013 | Harper et al. | |
| 2016/0034838 A1 | 2/2016 | Gembicki | |
| 2016/0314066 A1* | 10/2016 | Mirza | G06F 11/3692 |
| 2017/0123961 A1* | 5/2017 | Cerny | G06F 11/3668 |
| 2017/0168907 A1* | 6/2017 | Harper | G06F 11/14 |

* cited by examiner

|         | CPU Chaos | IO Chaos | Disk Chaos | Dependant Process or Service Chaos | Network Chaos |
|---------|-----------|----------|------------|-------------------------------------|---------------|
| Level 0 |           |          | 5%         |                                     |               |
| Level 1 | 10%       | 10%      | 10%        | 10%                                 | 10%           |
| Level 2 | 20%       | 20%      | 20%        | 20%                                 | 20%           |
| Level 3 | 40%       | 30%      | 45%        | 40%                                 | 45%           |

METHOD OF CERTIFYING RESILIENCY AND RECOVERABILITY LEVEL OF SERVICES BASED ON GAMING MODE CHAOSING

BACKGROUND

The present application generally relates to computer networks, and more particularly, to techniques of certifying resiliency and recoverability level of services.

DESCRIPTION OF THE RELATED ART

A cloud infrastructure, which may be used as a service delivery model, abstracts the complete setup and management of IT resources, as well as allows users to explore the compute environments in self-service mode. These services form an inherent part of computing. The resiliency and recoverability of these services is of great importance to the success of the businesses in the cloud.

There are several tools available to test the stability of the services. Such tools inject "chaos" into the system, and then take care of the aftermath caused from the chaos. Injecting such chaos into the system helps to strengthen the application or service by identifying vulnerabilities found, or errors caused, from the chaos. However, due to the amount of chaos introduced into the system, conventional tools have difficulty narrowing down the exact problem, and revival thereof, of the application itself. This result often credits the application to a pass or a fail based on the success of the chaos tests.

SUMMARY

Embodiments of the present disclosure provide a method, system, and computer program product for certifying resiliency and recoverability level of services. The method, system and computer program product include receiving a level of testing for a target service used by an application in an ordinary course of operation. The monitoring system disrupts expected behavior of the application by adjusting one or more parameters of the application. The monitoring system determines whether the service is able to recover based on the application behavior. Upon determining that the service is able to recover based on the application behavior, reporting the level of testing as the level of testing received.

BRIEF DESCRIPTION OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this invention and are therefore not to be considered limiting of its scope, for the present disclosure may admit to other equally effective embodiments.

DETAILED DESCRIPTION

Cloud providers typically include the computing resources required to support the execution of cloud-based applications. The infrastructure for the cloud provider typically includes virtual and physical computing hardware, along with application and system software. The cloud provider is configured to host one or more applications. The one or more applications are accessible to the client system(s) over the network. The application includes one or more services made accessible to one or more users via the cloud provider. For example, the one or more services may include a client-server communication protocol such as representational state transfer (REST) application programming interfaces (APIs) or a web server.

Monitoring tools may be implemented to inject chaos into the application to test the stability of the one or more services. For example, such chaos may be in the form of "killing off" or ending processes running in the application and then reviving the application. One of the major problems with conventional monitoring tools is that conventional monitoring tools only tell the user whether the application has survived or failed revival from the chaos.

In addition to improving the way in which a service resiliency or recoverability level can be certified, the present disclosure discusses the increased transparency to the consumer of any service on the resiliency or recoverability level of the services they are paying for. Monitoring services are already available (or upcoming) as billable services in public clouds. By defining chaos levels, the cloud developers can actually bill chaos services differently for each level. Additionally, special levels can have special billings associated therewith. Each consumer would come to know the resiliency and recoverability level of service they are planning to consume. Based off the resiliency level, services can be billed and the consumer will receive what they pay for in terms of resiliency and recoverability.

Additionally, the method described below will make it simpler for services (development teams of services) to adopt monitoring services. For example, if a development team is building a service and the teams wants to ensure/support a minimum level of resiliency in the initial releases, the present disclosure allows developers to select a desired level of chaos. Similarly, advanced resiliency and recoverability levels can be ensured/certified at later releases of the service based on business requirements.

Embodiments of the present disclosure provide a method, system, and computer program product for certifying resiliency and recoverability level of services. The method, system and computer program product include receiving input on a level of testing for a target service of an application. The monitoring system introduces chaos on various parameters of the application based on a policy associated with the inputted level of recoverability and resiliency. The monitoring system determines whether the service is resilient and is able to recover based on the introduced parameters. Upon determining that the service passes the level of testing, the monitoring system reports the level of testing as the inputted level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the monitoring system) available in the cloud. For example, the monitoring system could execute on a computing system in the cloud and receive user requests (e.g., queries) to certify resiliency and recoverability level of services. In such a case, the monitoring system receives input on a level of testing for a target service of an application. The monitoring system introduces chaos on various parameters of the application based on a policy associated with the inputted level of recoverability and resiliency. The monitoring system determines whether the service is resilient and is able to recover based on the introduced parameters. Upon determining that the service passes the level of testing, the monitoring system reports the level of testing as the inputted level.

Figure 1:
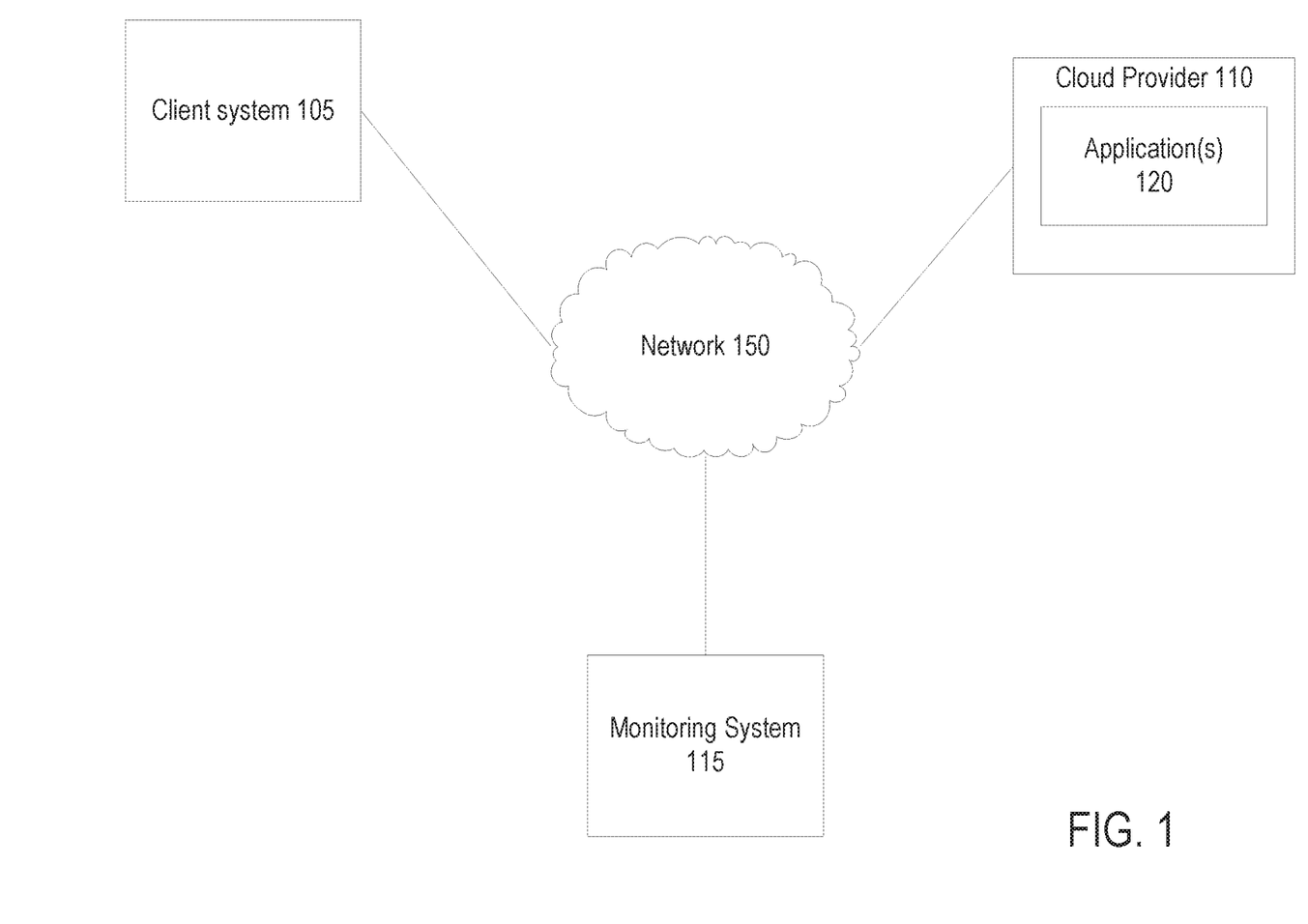
FIG. 1 illustrates a computing environment, according to one embodiment.

FIG. 1 illustrates a computing environment 100, according to one embodiment. The computing environment 100 is configured to provide a networked application to one or more client systems. The computing environment 100 includes client system(s) 105, a monitoring system 115, and a cloud provider 110 all connected by a network 150. Cloud providers typically include the computing resources required to support the execution of cloud-based applications. Thus, the infrastructure for the cloud provider typically includes virtual and physical computing hardware, along with application and system software. The cloud provider 110 is configured to host one or more applications 120. The one or more applications 120 are accessible to the client system(s) 105 over the network 150.

The monitoring system 115 is configured to test the stability of one or more services of the application 120. The monitoring system 115 tests the stability of one or more services of the application 120 by injecting chaos into the system and reacting to the aftermath caused by the chaos. There are several tools available to test the stability of the services by injecting chaos into the system, such as Chaos Monkey, commercially available from Netflix. Injecting chaos and reacting to the aftermath aids in strengthening the application or service. Conventional monitoring systems have difficulty, however, narrowing down the exact problem, and the revival thereof, when a large amount of chaos is introduced in the system. The result often credits the application to a pass or a fail based on the success of the chaos tests.

The chaos monitoring system 115 improves upon the existing tools for testing the stability of services, as well as expands their functionalities. The chaos monitoring system 115 takes a gaming approach to the chaos tests. The chaos monitoring system 115 is configured to test the stability of one or more services of the application 120 as applied to various policy levels. Each policy level is defined as the level of chaos induced in a target service by challenging various parameters to the range or level that is expected. As each policy level is cleared, the service can be certified against that. For example, when the services has cleared four levels of chaos testing, the service can be credit level 4 certified in resiliency and recoverability. This expands functionality of existing tools by allowing development teams to adopt the chaos services for resiliency testing. Additionally, it ensures the resiliency level of any service to be clearly visible to the end customer.

Figure 2:
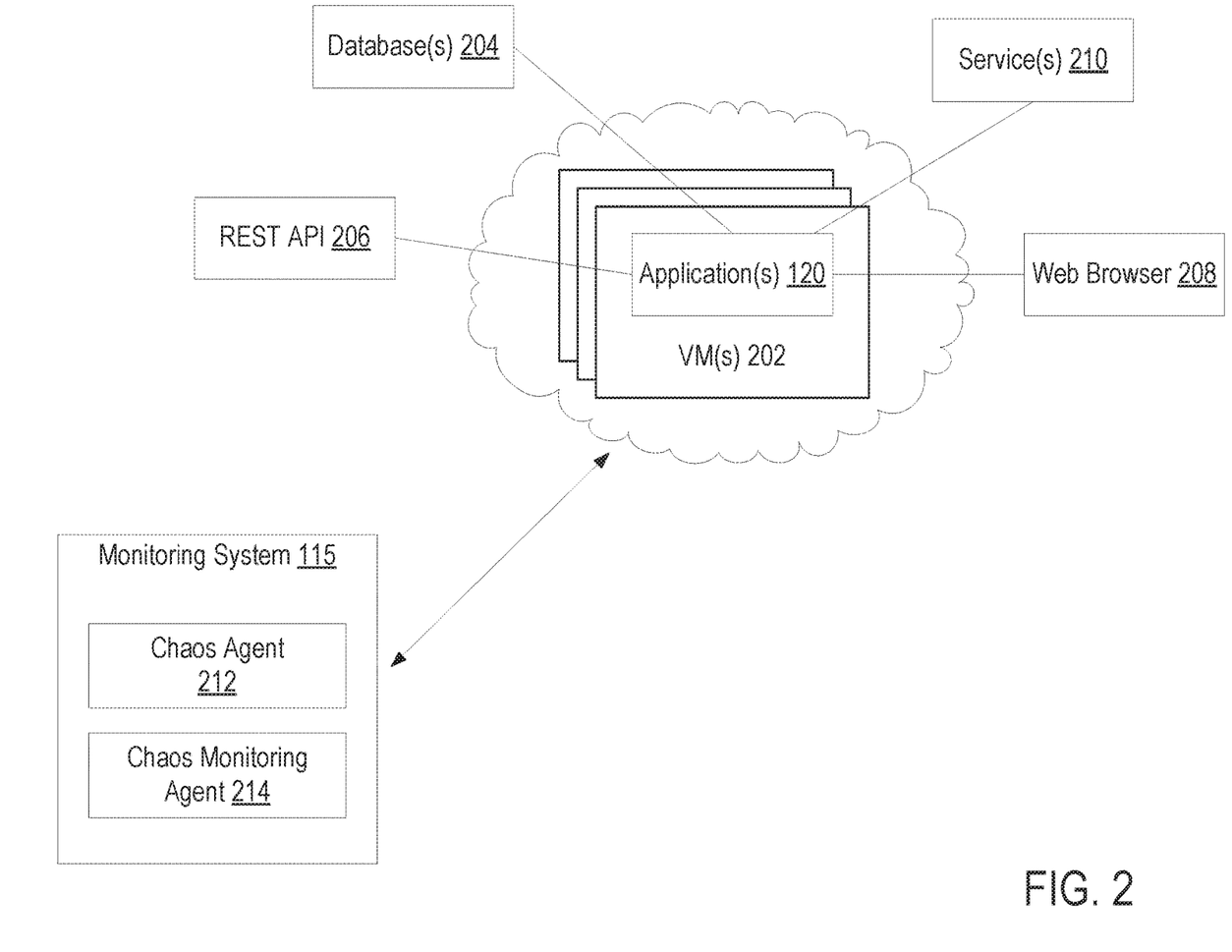
FIG. 2 illustrates a detailed view of the computing system, according to one embodiment

FIG. 2 illustrates a detailed view of the computing system 100, according to one embodiment. As depicted, the cloud provider 110 includes one or more virtual machines 202. The one or more virtual machines 202 may be used for the development, testing, staging, and production of one or more applications 120. In other embodiments, the cloud provider 110 may include one or more deployment environments (not shown). Each of the one or more deployment environments include on or more virtual machines. Collectively, the one or more virtual machines, across multiple deployment environments, may be used for the development, testing, staging and production of one or more applications 120.

The application 120 includes one or more services 210 made accessible to one or more users via the cloud provider 110. For example, the one or more services may include a client-server communication protocol such as representational state transfer (REST) application programming interfaces (APIs) 206, web services 208, databases 204, and the like. The monitoring system 105 is configured to test and monitor the stability of the services 210 by injecting chaos into the application 120. Testing the stability of the services 210 by injecting chaos into the application 120 strengthens the application 120 and the services 210.

The monitoring system 105 includes a chaos injection agent 212 and a chaos monitoring agent 214. The chaos injection agent 212 is configured to inject various levels of chaos into the application 120. Injecting various levels of chaos into the application 120 allows for accurate certification of the resilience/recoverability levels of service. For example, the chaos injection agent 212 may inject chaos for a variety of parameters based on the level of chaos as defined by its policy in the chaos definition table. The chaos monitoring agent 214 is configured to monitor the application 120 as it runs with the chaos injected therein. For example, the chaos monitoring agent 214 monitors the application 120 to determine if it is able to recover and is resilient to the random failures as defined by the parameters.

Figure 3:
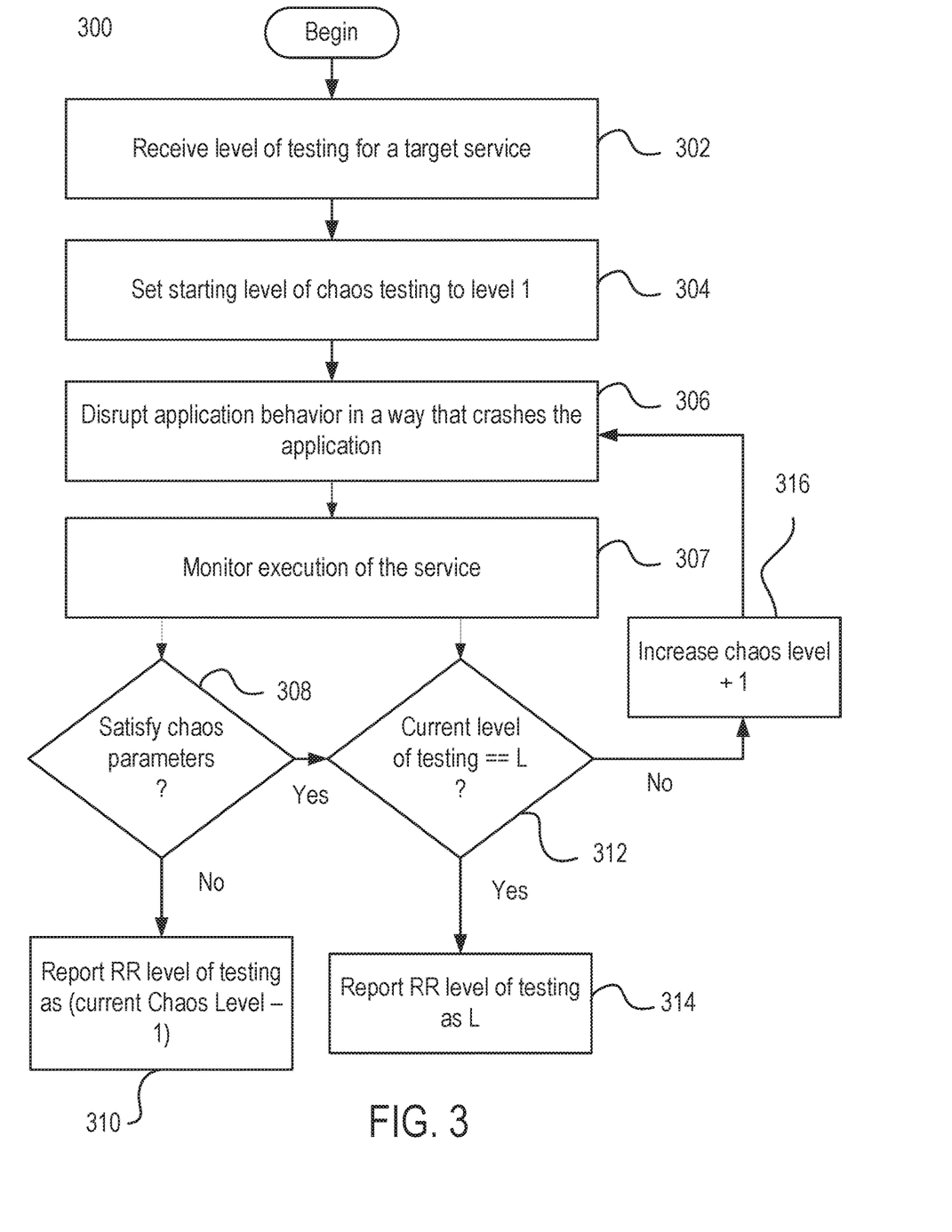
FIG. 3 is a flow diagram of a method for certifying resiliency and recoverability level of services, according to one embodiment.

FIG. 3 is a flow diagram of a method 300 for certifying resiliency and recoverability level of services, according to one embodiment. The monitoring agent 115 receives a level of testing for a target service used by an application in an ordinary course of operation (step 302). The level of testing can be defined as the level of "chaos" induced in a target service by challenging various parameters to the range/level that is expected/defined. A service is declared as acquired the level of recoverability or resiliency if it is able to successfully withstand the induced chaos in that level. A particular level of chaos may include one or more chaos parameters. For example, the chaos parameters may include challenging or burning the available CPU to a particular percentage, challenging or burning the available I/O devices to a particular percentage, filling or disrupting available disk to a particular percentage, disrupting dependent processes or services to a particular percentage, challenging the network by inducing corruption, latency, or loss to a particular percentage, and the like. The chaos level policy is the construct, which defines the chaos level of the testing.

Figure 4:
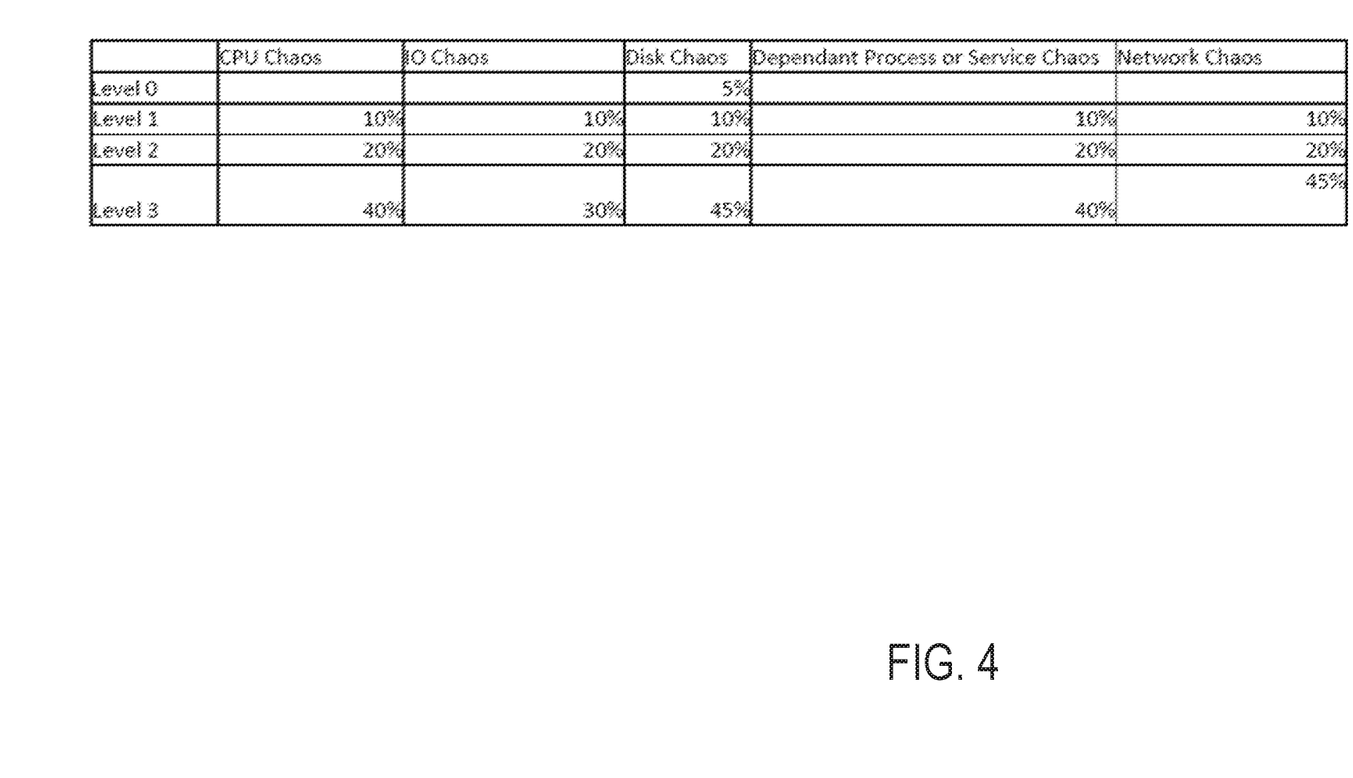
FIG. 4 illustrates a chaos level definition table, according to one embodiment.

Referring to FIG. 4, one or more chaos level policies may be stored in a chaos level definition table. Each row in the chaos level definition table is defined as a chaos level policy. For example, referring to row 2, at Level 1 the CPU is burned to 10%, the I/O is challenged to 10%, the disk is randomly filled to 10%, the dependent processes or services are disrupted to 105 (e.g., one out of ten services or process will be disrupted), and the network is challenged to 10%. The chaos levels and associated policies, however, may not need to define all parameters. For example, Level 0 (row 1 of the table) only has the disk randomly filled up to 10%; all other parameters are not chaosed.

The chaos level definition table can also have specialized levels of testing for particular services. For example, in a gaming service, the CPU should be chaosed much more, even in the initial levels of testing. For example, such a service should have policies with a minimum of 75% of CPU usage. As illustrated, such policies are to be defined based on custom and special requirements, and would by tightly coupled to the nature or business of the service that is getting chaosed.

Referring back to FIG. 3, the monitoring system 115 starts the level of chaos testing at level 1 (step 304). For example, referring to the chaos level definition table, the monitoring system 115 sets the level of testing to the chaos level policy associated with level 1. The monitoring system 115 then disrupts expected behavior of the application by adjusting one or more parameters of the application (step 306). For example, the monitoring system 115 disrupts expected behavior by introducing chaos on various parameters based on the chaos level definition table for the current level of chaos testing. The process of introducing chaos on various parameters is discussed in more detail below in conjunction with FIG. 5.

The monitoring system 115 monitors execution of the service used by the application in the ordinary course of operation (step 307). The monitoring system 115 determines whether the service is able to recover based on the application behavior (step 308). For example, referring to level 1 of the chaos level definition table, the monitoring system 115 determines whether the application is able to recover when the disk is randomly filled up to 5%. If the monitoring system 115 determines that the chaos parameters are not satisfied (step 310), the monitoring system 115 reports the level of testing as:

Current Chaos Level—1

The monitoring system 115 reports the level of chaos as (current chaos level—1) because the application did not "pass" resiliency/recoverability testing for the current level of chaos. Thus, at best, the application has a recoverability/resiliency level of (current level of chaos—1). Using the example of level 1, the application has a recoverability/resiliency level of Level 0.

If the monitoring system 115 determines that service is able to recover, the monitoring system 115 determines the current level of testing (step 312). For example, referring to level 1 of the chaos level definition table, the monitoring system 115 has determined that the application is able to recover and is resilient when the disk randomly filled up to 5%. If the monitoring system 115 determines that the current level of testing equals L, where L is the input from step 202, then the monitoring system 115 reports the level of testing as L (step 314).

If the monitoring system 115 determines that the current level of testing does not equal L, then the monitoring system 115 increases the level of testing by 1 (step 316). The method 300 then reverts to step 306 for continued testing. For example, assume that at step 202, the monitoring system 115 received an input of Level 3 recoverability/resiliency testing. The monitoring system 115 begins monitoring the service by introducing Chaos level policy 1. If the monitoring system 115 determines that the service is not able to recover, then it reports the recoverability/resiliency level of service as 0. If, however, the monitoring system 115 determines that the service is able to recover, then the monitoring system 115 determines whether the current level of testing (Level 1) is equal to the input (Level 3). Because the current level of testing is not equal to the input, the monitoring system 115 increases the chaos level from Level 1 to Level 2. The monitoring system 115 then continues the process of disrupting expected application behavior by adjusting one or more parameters based on the chaos level definition table.

Figure 5:
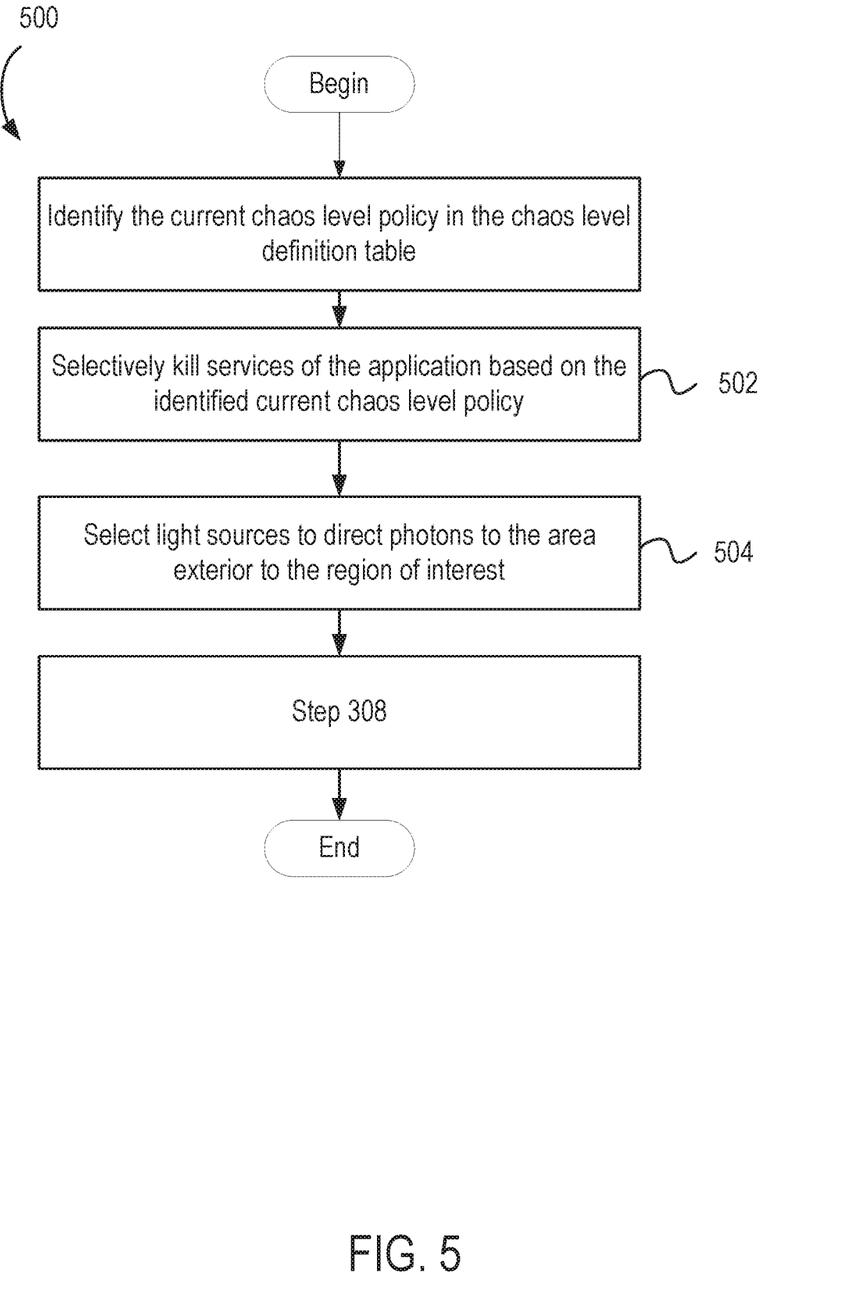
FIG. 5 is a flow diagram illustrating in more detail step from FIG. 3, discussed above.

FIG. 5 is a flow diagram illustrating in more detail step 306 from FIG. 3, discussed above. Referring back to FIG. 3, at step 306, the monitoring system 115 introduces chaos on various parameters based on the chaos level definition table for the current level of chaos testing. To introduce chaos on the various parameters, the monitoring system 115 defines a first environment in which chaos is to be introduced (step 502). For example, referring to Chaos Level Policy 2 in the chaos level definition table, the monitoring system 115 defines as the first environment the CPU. In another example, the monitoring system 115 may define as the first environment, the I/O devices, the network, the disk drive, and the like.

The monitoring system 115 then defines the one or more processes that will be killed when chaos is introduced (step 504). Continuing with the above example, the monitoring system 115 locates an entry for the CPU environment on the chaos level definition table. As illustrated in the chaos level definition table, the monitoring system 115 defines one or more processes that will killed to challenge or burn the available CPU to 10%.

The monitoring system 115 kills the one or more defined processes (step 506). Killing the one or more defined processes results in challenging or burning the available CPU to the desired amount. Referring to the above example, the monitoring system 115 kills the one or more processes that result in challenging or burning the available CPU to 10%. After the monitoring system 115 kills the one or more defined processes, the monitoring system 115 determines whether there are any additional environments in the chaos level policy (step 508). Continuing with the above example, after the CPU environment, the IO, disk, network, and processes/services environments remain. If additional environments remain, the method reverts to step 502 for continued introduction of chaos. If no additional environments remain, the method continues to step 308.

Figure 6:
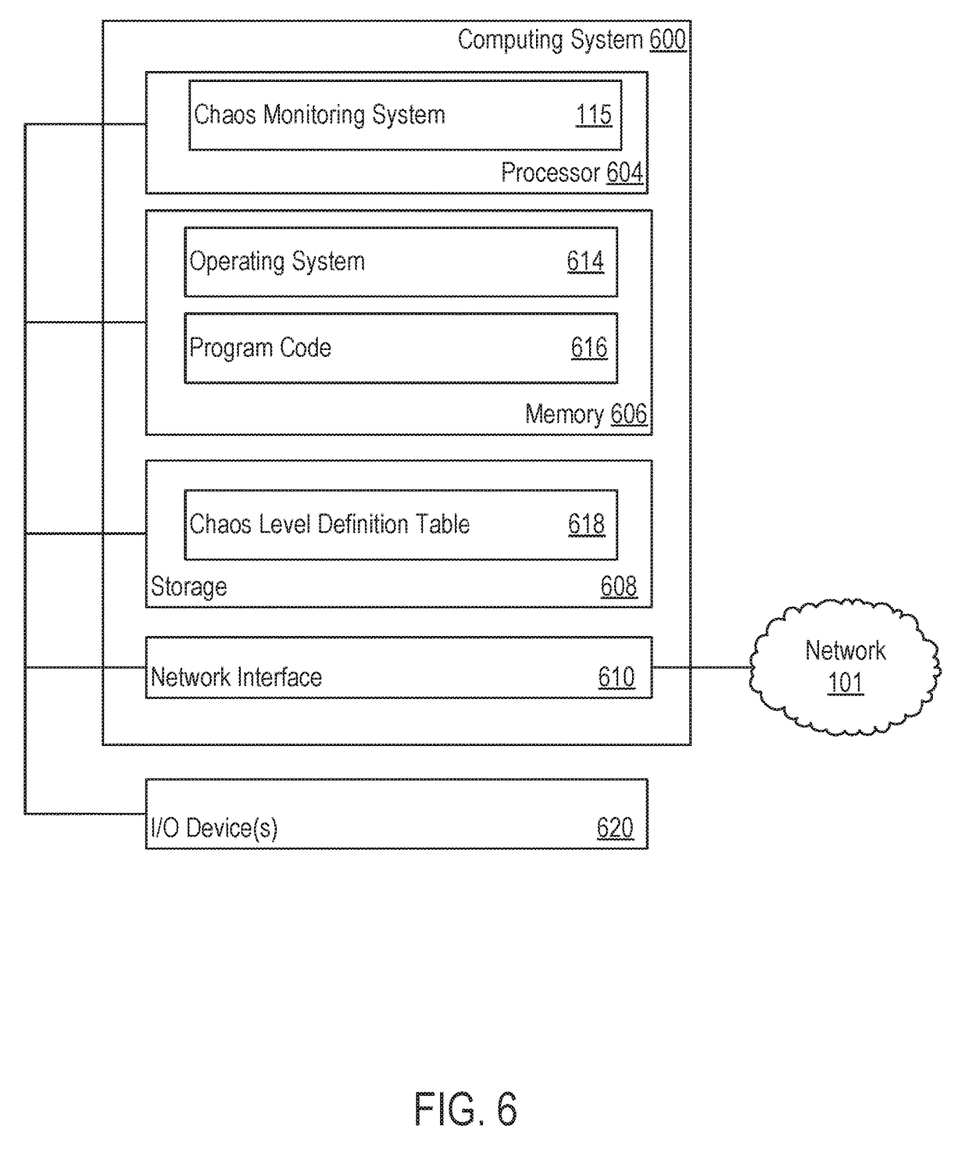
FIG. 6 illustrates a computing system, according to one embodiment.

FIG. 6 illustrates a computer system 600, such as client system 105, according to one embodiment. The computer system 600 includes a processor 604, a memory 606, storage 608, and network interface 610. The processor 604 may be any processor capable of performing the functions described herein. The computer system 600 may connect to the network 101 using the network interface 610. Furthermore, as will be understood by one of ordinary skill in the art, any computer system capable of performing the functions described herein may be used.

The processor 604 includes the chaos monitoring system 115. The chaos monitoring system 115 is configured to test the stability of one or more services of the application 120 as applied to various policy levels. Each policy level is defined as the level of chaos induced in a target service by challenging various parameters to the range or level that is expected. The chaos monitoring system 115 access the policy levels from a chaos level definition table 618 contained in storage 608. For example, the chaos level definition table 618 is substantially similar to the chaos level definition table 400 discussed above in conjunction with FIG. 4.

In the pictured embodiment, the memory 606 contains an operating system 614 and program code 616. Although memory 606 is shown as a single entity, memory 606 may include one or more memory devices having blocks of memory associated with physical addresses, such as random access memory (RAM), read only memory (ROM), flash memory, or other types of volatile and/or non-volatile memory. The program code 616 is generally configured to carry out the monitoring methods discussed in conjunction with FIGS. 3-5 above. The memory 606 is an example of tangible media configured to store data such as chaos testing history, level certification, and the like. Other types of tangible media include floppy disks, removable hard disks, optical storage media, such as CD-ROMs and DVDs, and bar codes, and the like.

While the foregoing is directed to embodiments of the present invention, other and further embodiments of the present disclosure may be devised without departing from the basic scope thereof, and the scope thereof is determined by the claims that follow.

What is claimed is:

1. A method, comprising:
receiving a level of testing for a service used by an application in an ordinary course of operation;
disrupting expected behavior of the application by adjusting one or more parameters of the application;
monitoring first application behavior during execution of the service used by the application in the ordinary course of operation;
determining whether the service is able to recover based on the first application behavior; and
upon determining that the service is able to recover based on the first application behavior, reporting the level of testing as the level of testing received.

2. The method of claim 1, further comprising:
receiving a second level of testing for the service used by the application in ordinary course of operation;
disrupting expected behavior of the application by adjusting one or more parameters of the application;
monitoring second application behavior during execution of the service used by the application in the ordinary course of operation;
determining whether the service is able to recover based on the second application behavior; and
upon determining that the service is not able to recover, reporting the level of testing as one less than the level of testing received.

3. The method of claim 1, further comprising:
receiving a second level of testing for the service used by the application in ordinary course of operation;
setting a starting level at a first level of testing;
disrupting expected behavior of the application by adjusting one or more parameters of the application based on the first level of testing;
monitoring second application behavior during execution of the service used by the application in the ordinary course of operation;
determining whether the service is able to recover based on the second application behavior; and
upon determining that the service is not able to recover, reporting the level of testing as one less than the starting level.

4. The method of claim 1, further comprising:
receiving a second level of testing for the service used by the application in ordinary course of operation;
setting a starting level at a first level of testing;
disrupting expected behavior of the application by adjusting one or more parameters of the application based on the first level of testing;
monitoring execution of the service used by the application in the ordinary course of operation;
upon determining that the service is able to recover, determining whether a current level of testing is equal to the second level of testing received; and
upon determining that the current level of testing is equal to the second level of testing received, reporting the level of testing as the second level of testing received.

5. The method of claim 1, further comprising:
receiving a second level of testing for the service used by the application in ordinary course of operation;
setting a starting level at a first level of testing;
disrupting expected behavior of the application by adjusting one or more parameters of the application based on the first level of testing;
monitoring execution of the service used by the application in the ordinary course of operation;
upon determining that the service is able to recover, determining whether a current level of testing is equal to the second level of testing received; and
upon determining that the current level of testing is not equal to the second level of testing received:
increasing the current level of testing to an increased level of testing,
disrupting expected behavior of the application by adjusting one or more parameters of the application based on the increased level of testing, and
determining whether the service is able to recover based on the adjusted one or more parameters associated with increased level of testing.

6. The method of claim 1, wherein disrupting expected behavior of the application by adjusting one or more parameters of the application, comprises:
defining a first environment in which the one or more parameters will be adjusted;
defining one or more processes to be terminated based on a policy; and
terminating the defined one or more processes.

7. The method of claim 1, wherein reporting the level of testing as the level of testing received comprises:
certifying to an end customer that the application has passed a level of testing equal to the received level.

8. A system, comprising:
a computer processor; and
a memory containing a program that, when executed on the computer processor, performs an operation comprising:
receiving a level of testing for a service used by an application in an ordinary course of operation;
disrupting expected behavior of the application by adjusting one or more parameters of the application;
monitoring first application behavior during execution of the service used by the application in the ordinary course of operation;

determining whether the service is able to recover based on the first application behavior; and upon determining that the service is able to recover based on the first application behavior, reporting the level of testing as the level of testing received.

9. The system of claim 8, further comprising:
receiving a second level of testing for the service used by the application in ordinary course of operation;
disrupting expected behavior of the application by adjusting one or more parameters of the application;
monitoring second application behavior during execution of the service used by the application in the ordinary course of operation;
determining whether the service is able to recover based on the second application behavior; and
upon determining that the service is not able to recover, reporting the level of testing as one less than the level of testing received.

10. The system of claim 8, further comprising:
receiving a second level of testing for the service used by the application in ordinary course of operation;
setting a starting level at a first level of testing;
disrupting expected behavior of the application by adjusting one or more parameters of the application based on the first level of testing;
monitoring second application behavior during execution of the service used by the application in the ordinary course of operation;
determining whether the service is able to recover based on the second application behavior; and
upon determining that the service is not able to recover, reporting the level of testing as one less than the starting level.

11. The system of claim 8, further comprising:
receiving a second level of testing for the service used by the application in ordinary course of operation;
setting a starting level at a first level of testing;
disrupting expected behavior of the application by adjusting one or more parameters of the application based on the first level of testing;
monitoring execution of the service used by the application in the ordinary course of operation;
upon determining that the service is able to recover, determining whether a current level of testing is equal to the second level of testing received; and
upon determining that the current level of testing is equal to the second level of testing received, reporting the level of testing as the second level of testing received.

12. The system of claim 8, further comprising:
receiving a second level of testing for the service used by the application in ordinary course of operation;
setting a starting level at a first level of testing;
disrupting expected behavior of the application by adjusting one or more parameters of the application based on the first level of testing;
monitoring execution of the service used by the application in the ordinary course of operation;
upon determining that the service is able to recover, determining whether a current level of testing is equal to the second level of testing received; and
upon determining that the current level of testing is not equal to the second level of testing received:
increasing the current level of testing to an increased level of testing,
disrupting expected behavior of the application by adjusting one or more parameters of the application based on the increased level of testing, and
determining whether the service is able to recover based on the adjusted one or more parameters associated with increased level of testing.

13. The system of claim 8, wherein disrupting expected behavior of the application by adjusting one or more parameters of the application, comprises:
defining a first environment in which the one or more parameters will be adjusted;
defining one or more processes to be terminated based on a policy; and
terminating the defined one or more processes.

14. The system of claim 8, wherein reporting the level of testing as the level of testing received comprises:
certifying to an end customer that the application has passed a level of testing equal to the received level.

15. A computer program product, comprising:
a computer-readable storage medium having computer readable program code embodied therewith, the computer readable program code comprising:
receiving a level of testing for a service used by an application in an ordinary course of operation;
computer readable program code to disrupt expected behavior of the application by adjusting one or more parameters of the application;
computer readable program code to monitor first application behavior during execution of the service used by the application in the ordinary course of operation;
computer readable program code to determine whether the service is able to recover based on the first application behavior; and
computer readable program code to report the level of testing as the level of testing received, upon determining that the service is able to recover based on the first application behavior.

16. The computer program product of claim 15, further comprising:
receiving a second level of testing for the service used by the application in ordinary course of operation;
disrupting expected behavior of the application by adjusting one or more parameters of the application;
monitoring second application behavior during execution of the service used by the application in the ordinary course of operation;
determining whether the service is able to recover based on the second application behavior; and
upon determining that the service is not able to recover, reporting the level of testing as one less than the level of testing received.

17. The computer program product of claim 15, further comprising:
receiving a second level of testing for the service used by the application in ordinary course of operation;
setting a starting level at a first level of testing;
disrupting expected behavior of the application by adjusting one or more parameters of the application based on the first level of testing;
monitoring second application behavior during execution of the service used by the application in the ordinary course of operation;
determining whether the service is able to recover based on the second application behavior; and
upon determining that the service is not able to recover, reporting the level of testing as one less than the starting level.

18. The computer program product of claim 15, further comprising:

receiving a second level of testing for the service used by the application in ordinary course of operation;
setting a starting level at a first level of testing;
disrupting expected behavior of the application by adjusting one or more parameters of the application based on the first level of testing;
monitoring execution of the service used by the application in the ordinary course of operation;
upon determining that the service is able to recover, determining whether a current level of testing is equal to the second level of testing received; and
upon determining that the current level of testing is equal to the second level of testing received, reporting the level of testing as the second level of testing received.

19. The computer program product of claim 15, further comprising:
receiving a second level of testing for the service used by the application in ordinary course of operation;
setting a starting level at a first level of testing;
disrupting expected behavior of the application by adjusting one or more parameters of the application based on the first level of testing;
monitoring execution of the service used by the application in the ordinary course of operation;
upon determining that the service is able to recover, determining whether a current level of testing is equal to the second level of testing received; and
upon determining that the current level of testing is not equal to the second level of testing received:
increasing the current level of testing to an increased level of testing,
disrupting expected behavior of the application by adjusting one or more parameters of the application based on the increased level of testing, and
determining whether the service is able to recover based on the adjusted one or more parameters associated with increased level of testing.

20. The computer program product of claim 15, wherein disrupting expected behavior of the application by adjusting one or more parameters of the application, comprises:
defining a first environment in which the one or more parameters will be adjusted;
defining one or more processes to be terminated based on a policy; and
terminating the defined one or more processes.

* * * * *